US00RE42596E

(19) United States
(12) Reissued Patent
Sesser

(10) Patent Number: US RE42,596 E
(45) Date of Reissued Patent: Aug. 9, 2011

(54) MICRO-STREAM ROTATOR WITH ADJUSTMENT OF THROW RADIUS AND FLOW RATE

(75) Inventor: George Sesser, Walla Walla, WA (US)

(73) Assignee: Hunter Industries, Inc., San Marcos, CA (US)

( * ) Notice: This patent is subject to a terminal disclaimer.

(21) Appl. No.: 11/871,456

(22) Filed: Oct. 12, 2007

Related U.S. Patent Documents

Reissue of:
(64) Patent No.: Re. 40,440
Issued: Jul. 22, 2008
Appl. No.: 11/022,428
Filed: Dec. 27, 2004

Which is a Reissue of:
(64) Patent No.: 6,499,672
Issued: Dec. 31, 2002
Appl. No.: 09/532,772
Filed: Mar. 22, 2000

U.S. Applications:
(63) Continuation of application No. 11/022,428, filed on Dec. 27, 2004, now Pat. No. Re. 40,440, which is a continuation-in-part of application No. 09/433,299, filed on Nov. 3, 1999, now Pat. No. 6,244,521.

(51) Int. Cl.
*B05B 17/04* (2006.01)

(52) U.S. Cl. ..... 239/11; 239/232; 239/252; 239/262; 239/443; 239/484; 239/514; 239/518; 239/222.11

(58) Field of Classification Search ..... 239/203, 239/222.11, 231, 243, 252, 451, 511, 512, 239/513, 514
See application file for complete search history.

(56) References Cited

U.S. PATENT DOCUMENTS 3,131,867 A 5/1964 Miller et al.

(Continued)

OTHER PUBLICATIONS

Complaint for Declaratory Judgment of Patent Non-Infringement and Invalidity; U.S. District Court—Central District of California, Case No. CV 07-2811 GPS (JTLx); *Rain Bird Corporation* v. *Nelson Irrigation Corporation;* Filed: Apr. 27, 2007.

(Continued)

*Primary Examiner* — Dinh Nguyen
(74) *Attorney, Agent, or Firm* — Knobbe Martens Olson & Bear, LLP

(57) ABSTRACT

A rotating stream sprinkler including a rotor plate supported on one end of a shaft for rotation, in an operative mode, relative to the shaft; a nozzle located along the shaft upstream of the rotor plate; the rotor plate formed with a chamber and one end of the shaft has a stator fixed thereto within the chamber, the fluid chamber at least partially filled with a viscous fluid; and wherein the chamber is at least partially closed at an upper end thereof by a rotor cap plate; and further wherein an underside of the rotor cap plate is provided with a first plurality of teeth and an upper surface of the stator is provided with a second plurality of mating teeth adapted to engage the first plurality of teeth to enable rotation of the rotor plate with the shaft in the adjustment mode. A flow rate adjustment mechanism includes a throttle member threadably mounted on the shaft for movement relative to the shaft, toward or away from an annular seat having a discontinuous edge such that the flow rate cannot be shut off by having the throttle member engage the seat.

57 Claims, 12 Drawing Sheets

U.S. PATENT DOCUMENTS

| | | | | | |
|---|---|---|---|---|---|
| 3,884,416 | A | | 5/1975 | King | |
| 3,934,820 | A | | 1/1976 | Phaup | |
| 3,940,066 | A | | 2/1976 | Hunter | |
| 3,955,764 | A | | 5/1976 | Phaup | |
| 4,119,275 | A | | 10/1978 | Hunter | |
| 4,154,404 | A | | 5/1979 | Clawson | |
| 4,189,099 | A | * | 2/1980 | Bruninga | 239/200 |
| 4,261,515 | A | | 4/1981 | Rosenberg et al. | |
| 4,579,285 | A | | 4/1986 | Hunter | |
| 4,634,052 | A | | 1/1987 | Grizzle et al. | |
| RE32,386 | E | | 3/1987 | Hunter | |
| 4,660,766 | A | | 4/1987 | Nelson et al. | |
| 4,815,662 | A | | 3/1989 | Hunter | |
| 4,842,201 | A | | 6/1989 | Hunter | |
| 4,850,532 | A | | 7/1989 | Mackanos | |
| 4,867,379 | A | | 9/1989 | Hunter | |
| 4,898,332 | A | | 2/1990 | Hunter et al. | |
| 4,932,590 | A | | 6/1990 | Hunter | |
| 4,944,456 | A | | 7/1990 | Zakai | |
| 4,967,961 | A | | 11/1990 | Hunter | |
| 4,971,250 | A | | 11/1990 | Hunter | |
| 4,986,474 | A | | 1/1991 | Schisler et al. | |
| 5,031,840 | A | | 7/1991 | Grundy et al. | |
| 5,058,806 | A | | 10/1991 | Rupar | |
| 5,083,709 | A | | 1/1992 | Iwanowski | |
| RE33,823 | E | | 2/1992 | Nelson et al. | |
| 5,098,021 | A | | 3/1992 | Kah, Jr. | |
| 5,148,990 | A | * | 9/1992 | Kah, Jr. | 239/222.17 |
| 5,226,602 | A | | 7/1993 | Cochran et al. | |
| 5,288,022 | A | | 2/1994 | Sesser | |
| 5,360,167 | A | | 11/1994 | Grundy et al. | |
| 5,556,036 | A | * | 9/1996 | Chase | 239/457 |
| 5,588,594 | A | | 12/1996 | Kah, Jr. | |
| 5,647,541 | A | | 7/1997 | Nelson | |
| 5,718,381 | A | | 2/1998 | Katzer et al. | |
| 5,762,270 | A | | 6/1998 | Kearby et al. | |
| 5,823,440 | A | | 10/1998 | Clark | |
| 5,927,607 | A | | 7/1999 | Scott | |
| 6,244,521 | B1 | | 6/2001 | Sesser | |
| 6,499,672 | B1 | | 12/2002 | Sesser | |
| 6,651,905 | B2 | | 11/2003 | Sesser et al. | |
| 6,736,332 | B2 | * | 5/2004 | Sesser et al. | 239/204 |
| 7,032,836 | B2 | * | 4/2006 | Sesser et al. | 239/204 |
| 7,159,795 | B2 | | 1/2007 | Sesser et al. | |
| RE40,440 | E | * | 7/2008 | Sesser | 239/222.11 |

OTHER PUBLICATIONS

Amended Complaint for Declaratory Judgment of Patent Non-Infringement and Invalidity; U.S. District Court—Central District of California, Case No. CV 07-2811 GPS (JTLx); *Rain Bird Corporation* v. *Nelson Irrigation Corporation;* Filed: Jun. 29, 2007.

Answer and Counterclaim of Hunter Industries Incorporated and Demand for Jury Trial; U.S. District Court—Central District of California, Case No. CV 07-2811 GPS (JTLx); *Rain Bird Corporation* v. *Nelson Irrigation Corporation;* Filed: Sep. 7, 2007.

Reply of Rain Bird to Hunter's Counterclaims; U.S. District Court—Central District of California, Case No. CV 07-2811 GPS (JTLx); *Rain Bird Corporation* v. *Nelson Irrigation Corporation;* Filed: Sep. 28, 2007.

* cited by examiner

MICRO-STREAM ROTATOR WITH ADJUSTMENT OF THROW RADIUS AND FLOW RATE

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

RELATED APPLICATIONS

[This is a continuation-in-part of application Ser. No. 09/433,299 filed Nov. 3, 1999, now U.S. Pat. No. 6,244,521.]

*More than one reissue application has been filed for the reissue of U.S. Pat. No. 6,499,672. The reissue applications of U.S. Pat. No. 6,499,672 are this Application and U.S. patent application Ser. No. 11/022,428, filed Dec. 27, 2004. This application is a continuation reissue application of U.S. patent application Ser. No. 11/022,428, which is a reissue application of U.S. patent application Ser. No. 09/532,772, filed Mar. 22, 2000, now U.S. Pat. No. 6,499,672, which is a continuation-in-part of U.S. patent application Ser. No. 09/433,299, filed Nov. 3, 1999, now U.S. Pat. No. 6,244,521, the entire contents of each of which are hereby expressly incorporated by reference.*

TECHNICAL FIELD

This invention relates to landscape and agricultural irrigation sprinklers and, specifically, to a rotating, viscously damped sprinkler which permits adjustment of the stream pattern, throw radius and flow rate.

BACKGROUND

Sprinklers utilizing a fixed nozzle to emit a stream onto the grooves of a viscously damped rotor plate are known in the art and examples of such constructions may be found in commonly owned U.S. Pat. Nos. 5,288,022 and 5,058,806. Sprinklers of this type may be incorporated into pop-up type arrangements or they may be mounted on, for example, fixed riser pipes. In either case, it is possible to employ adjustable or interchangeable nozzles having orifices which emit a 360° stream, a 180° stream, a 90° stream, etc. so as to produce a desired sprinkling pattern, to be determined primarily by the location of the sprinkler. There is also a need, however, to be able to adjust the throw radius and flow rate of the sprinkler without varying the water pressure.

SUMMARY OF THE INVENTION

This invention provides, in one exemplary embodiment, an internal rotary valve in the base of the sprinkler mechanism which can be actuated by pressing down on the sprinkler rotor plate to thereby engage a valve drive mechanism, and then rotating the rotor plate to open or close the internal valve between maximum open or closed positions, or any position therebetween.

In another exemplary embodiment, the flow rate adjustment mechanism incorporates an axially movable flow restrictor that is configured to restrict, but not completely shut off, the flow of water to the sprinkler nozzle.

As is well known in the art, the rotor plate itself is provided with specially configured grooves which cause the rotor plate to rotate when a stream emitted from the nozzle impinges on the grooves. The plate itself is mounted for rotation about a normally fixed, i.e., non-rotating shaft. Within the rotor plate, there is a chamber adapted to be at least partially filled with a high viscosity fluid. At the same time, there is a fixed stator mounted on the shaft, located within the chamber. As the rotor plate and chamber wall rotate about the shaft and the fixed stator, shearing of the viscous fluid occurs, slowing down the rotation of the rotor plate to produce a uniform and more well defined pattern. The shaft extends out of the rotor plate and into the sprinkler body, through the center of the nozzle. The nozzle itself is interchangeable with other nozzles having various opening configurations.

In one exemplary embodiment, the nozzle and an underlying generally cylindrical core flow path component are sandwiched between a removable sprinkler body cap and a baffle fixed to the lower end of the shaft for rotation with the shaft. The baffle contains a series of spokes or lobes which can rotate relative to ports formed in the core flow path component to regulate the amount of water flowing to the nozzle.

A rotor plate cap, held in place on the rotor plate by a retainer ring, is formed with an annular array of teeth adapted to engage with a mating annular array of teeth formed in the upper surface of the stator within the fluid chamber. The rotor plate cap and rotor plate can be pressed downwardly (assuming an upright orientation for the sprinkler) on the shaft (and relative to the shaft) so as to cause the teeth on the rotor plate cap and the fixed stator to engage. With the teeth so engaged, a "drive" mechanism is established between the rotor plate and the shaft so that manual rotation of the rotor plate causes the shaft to rotate as well. This results in the baffle rotating relative to the core flow path component to thereby throttle the flow through ports in the core to achieve the desired throw radius. When the rotor plate is returned upwardly to its original position, the respective teeth on the rotor plate cap and stator are disengaged, and the rotor plate is then free to rotate relative to the shaft in a normal operating mode.

In a second exemplary embodiment, the sprinkler body is simplified by incorporating three separate component parts, i.e., the sprinkler body cap, an inner sleeve and a part of the nozzle into a single base piece. The remaining components are mounted on the shaft, including a second nozzle component and the flow rate adjustment mechanism. With regard to the latter, a collar is press fit onto the lower end of the shaft, with threads formed on its exterior surface. A sleeve-like throttle member, constrained against rotation by interaction with a spider component, is threaded onto the collar so that manual rotation of the axially stationary shaft results in the throttle member moving up or down on the shaft, depending upon the direction of rotation of the shaft. The throttle member thus moves axially toward or away from a fixed seat secured to an otherwise conventional filter device which is itself fixed to the lower end of the base. The fixed seat comprises four vertically extending ribs in an annular array so that, when the throttle member is fully engaged with the seat, water flow to the nozzle will be restricted but not shut off. The way in which the shaft is rotated manually via the rotor plate to make the desired adjustment is otherwise as described above in connection with the first embodiment.

Thus, in accordance with its broader aspects, the present invention relates to a rotating stream sprinkler comprising a rotor plate supported on one end of a shaft for rotation, in an operative mode, relative to the shaft; a nozzle located along the shaft upstream of the rotor plate; the rotor plate formed with a chamber and one end of the shaft has a stator fixed thereto within the chamber, the fluid chamber at least partially filled with a viscous fluid; and wherein the chamber is at least partially closed at an upper end thereof by a rotor cap plate; and further wherein an underside of the rotor cap plate is provided with a first plurality of teeth and an upper surface of the stator is provided with a second plurality of mating teeth adapted to engage the first plurality of teeth in an adjustment mode.

In accordance with another aspect, the present invention relates to a rotating sprinkler comprising a sprinkler body having an inlet and an outlet including a stationary nozzle; a rotatable stream distributor plate mounted on a shaft downstream of the nozzle and having stream distribution grooves adapted to receive a stream from the nozzle and to distribute the stream; and means for adjusting the flow rate of water flowing to the nozzle.

In accordance with still another aspect, the present invention relates to a rotating sprinkler comprising a sprinkler body having an inlet and an outlet including a stationary nozzle; a rotatable stream distributor plate mounted on a shaft for rotation relative to the shaft, the distributor plate located downstream of the nozzle and having stream distribution grooves adapted to receive a stream from the nozzle and to distribute the stream; a flow rate adjustment mechanism comprising a throttle member threadably mounted on the shaft for movement relative to the shaft, toward or away from an annular seat having a discontinuous edge such that the flow rate cannot be shut off by having the throttle member engage the seat.

In still another aspect, the present invention relates to a rotating stream sprinkler comprising means for delivering liquid to a nozzle; means downstream of the nozzle for distributing liquid emitted from the nozzle in a desired sprinkling pattern; means for adjusting flow rate of water to the nozzle; and means for controlling speed of rotation of the means for distributing the liquid.

In still another aspect, the present invention relates to a rotating sprinkler comprising a sprinkler body; having an inlet, an outlet including a stationary nozzle; a rotatable stream distributor plate mounted on a shaft for rotation relative to the shaft, the distributor plate located downstream of the nozzle and having stream distribution grooves adapted to receive a stream from the nozzle and to distribute the stream; the distributor plate having a chamber formed therein at least partially filled with a viscous fluid, and a stator fixed to the shaft within the chamber, wherein rotational speed of the rotatable stream distributor plate is viscously dampened; and a flow rate adjustment mechanism comprising a throttle member threadably mounted for movement relative to the shaft, toward or away from an annular seat upstream of the throttle member.

Other advantages of the subject invention will become apparent from the detailed description that follows.

DETAILED DESCRIPTION OF THE DRAWINGS

Figure 1:
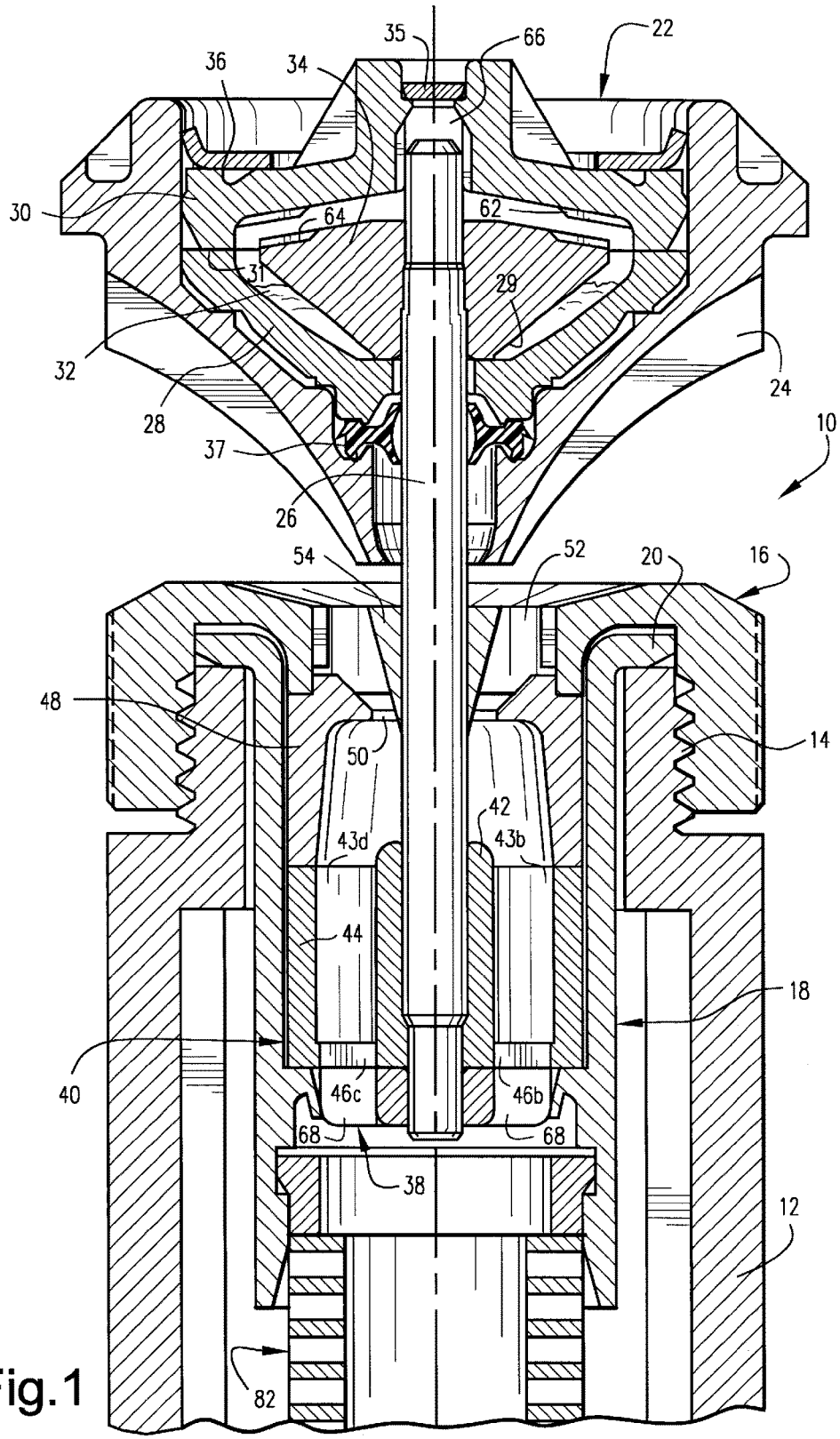
FIG. 1 is a partial side elevation of a micro-stream rotating type sprinkler in accordance with a first embodiment of the invention.

With reference now to FIG. 1, a rotary sprinkler device 10 is shown in connection with a well known pop-up sprinkler (partially shown) which includes a generally cylindrical riser or outer sleeve 12 which moves up and down within a sprinkler body (not shown) in response to water pressure. A pop-up sprinkler of this type is disclosed in the '806 patent, but this invention may be used with other pop-up sprinklers as well. The sleeve or riser 12 has a threaded upper end 14 to which is threadably engaged a sprinkler body cap 16. The sprinkler mechanism in accordance with this invention is supported within the riser 12 by means of an inner sleeve 18 having a radially outwardly directed flange 20 at the upper end thereof. The inner sleeve 18 is supported on the upper edge of the threaded upper end 14 of the outer sleeve or riser 12 and is held in place by the cap 16. The sprinkling mechanism itself includes a rotor plate 22, the underside of which is formed with a plurality of off-center circumferentially arranged grooves 24 which are configured to cause the rotor plate to rotate when a stream emitted from the sprinkler body impinges on the grooves. The rotor plate is supported on a generally stationary shaft 26 for rotation relative to the shaft. Within the rotor plate, there is a dish-shaped bearing 28, the lower end of which is formed with a hole 29 through which the shaft 26 passes. The upper end of the bearing is engaged by a lower edge 31 of an annular rotor body cap 30, these two components defining an internal fluid chamber 32. A fixed stator 34 is press fit onto the shaft 26 and is located within the chamber. The chamber is adapted to be filled or partially filled with a highly viscous fluid in order to slow the rotating or whirling speed of the rotor plate to a degree which maximizes stream uniformity. The rotor plate cap 30 is secured to the rotor plate 22 by means of an annular retainer ring 36. An annular flex seal 37 seals the lower end of the chamber 32 to prevent leakage of fluid as well as to prevent the ingress of dirt or debris into the chamber. The upper end of the chamber 32 is sealed by a plug 35 press fit in the top of the rotor plate cap 30. It is significant that there is a space between the top of the shaft 26 and the plug 35 which permits axial downward movement of the rotor plate 22 on and relative to the shaft 26 as explained further below.

Figure 7:
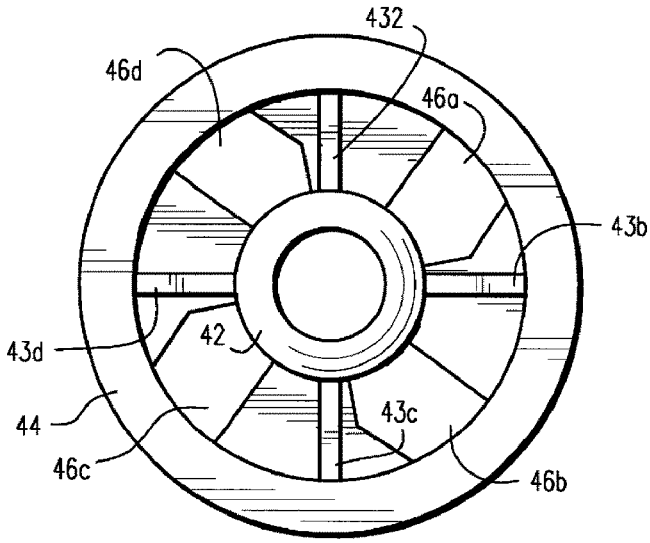
FIG. 7 is a top plan view of the core flow path component incorporated in FIGS. 1 and 2 and shown partially in FIGS. 3-5.

The opposite end of the shaft 26 supports three axially aligned components within the inner sleeve 18 in the sprinkler body. The first of these components is a baffle 38 (see also FIGS. 3-5) fixed to the lower end of the shaft 26. A core flow path component 40 is slidably received on the shaft above the baffle 38, and includes an inner wall 42 and an outer wall 44 with an annular space therebetween. The space is divided into four discrete flow passages by internal ribs 43a, b, c and d. These passages are accessed by four ports 46a, b, c and d at the lower end of the core, best seen in FIGS. 1 and 7. The ports 46 are smaller in cross sectional area than the passages themselves.

Supported above the core component is an annular nozzle 48 which has an open lower end axially aligned with the flow passages in the core component. The upper end of the nozzle has a restricted orifice 50 which may extend, e.g., 360°, about the shaft 26; 180° (see especially FIG. 8) about the shaft; or 90° about the shaft, depending on the desired shape of the sprinkling pattern. In the illustrated embodiment, the orifice extends approximately 180°. Note that the sprinkler body cap 16 includes a similarly shaped orifice 52 extending about a conically shaped, annular mounting sleeve 54 through which the shaft 26 passes.

Figure 8:
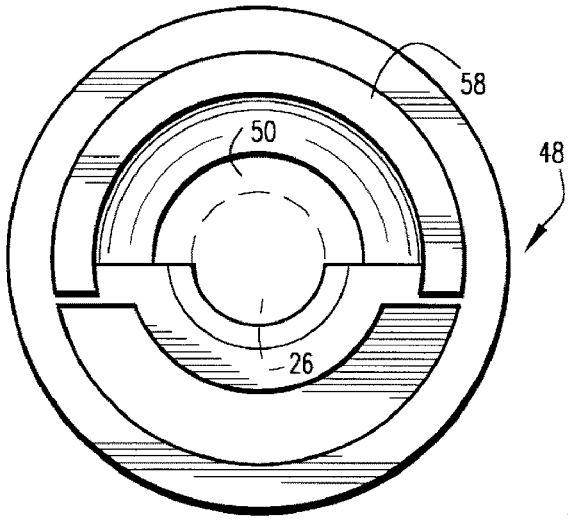
FIG. 8 is a top plan view of the nozzle component incorporated in the sprinkler shown in FIGS. 1, 2 and 6.
Figure 9:
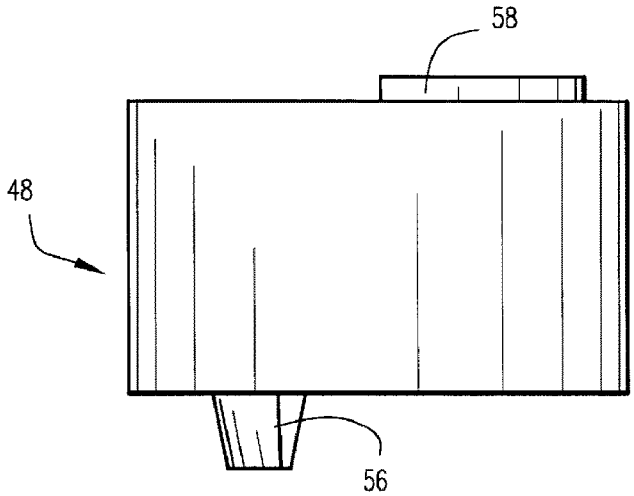
FIG. 9 is a side elevation of the nozzle component shown in FIG. 8 but rotated 90° in a clockwise direction.
Figure 10:
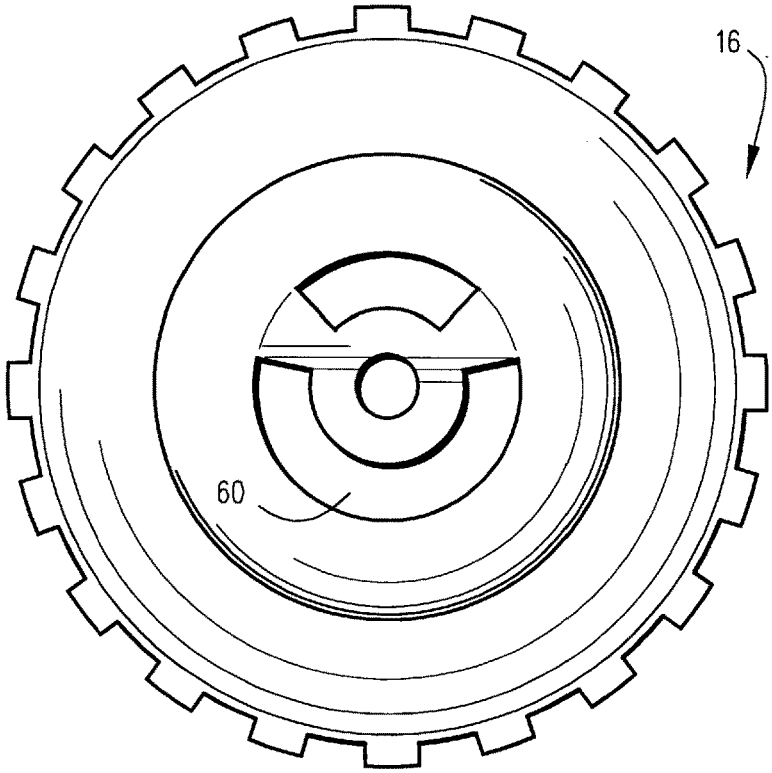
FIG. 10 is a top plan view of the sprinkler body cap incorporated in the sprinkler shown in FIGS. 1, 2 and 6.
Figure 11:
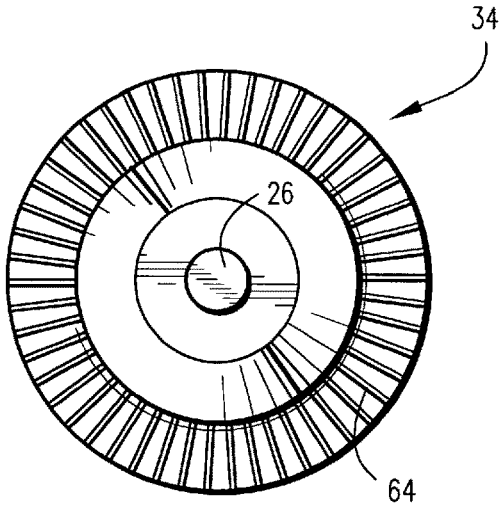
FIG. 11 is a top plan view of the stator component incorporated in the sprinkler shown in FIGS. 1, 2 and 6.
Figure 12:
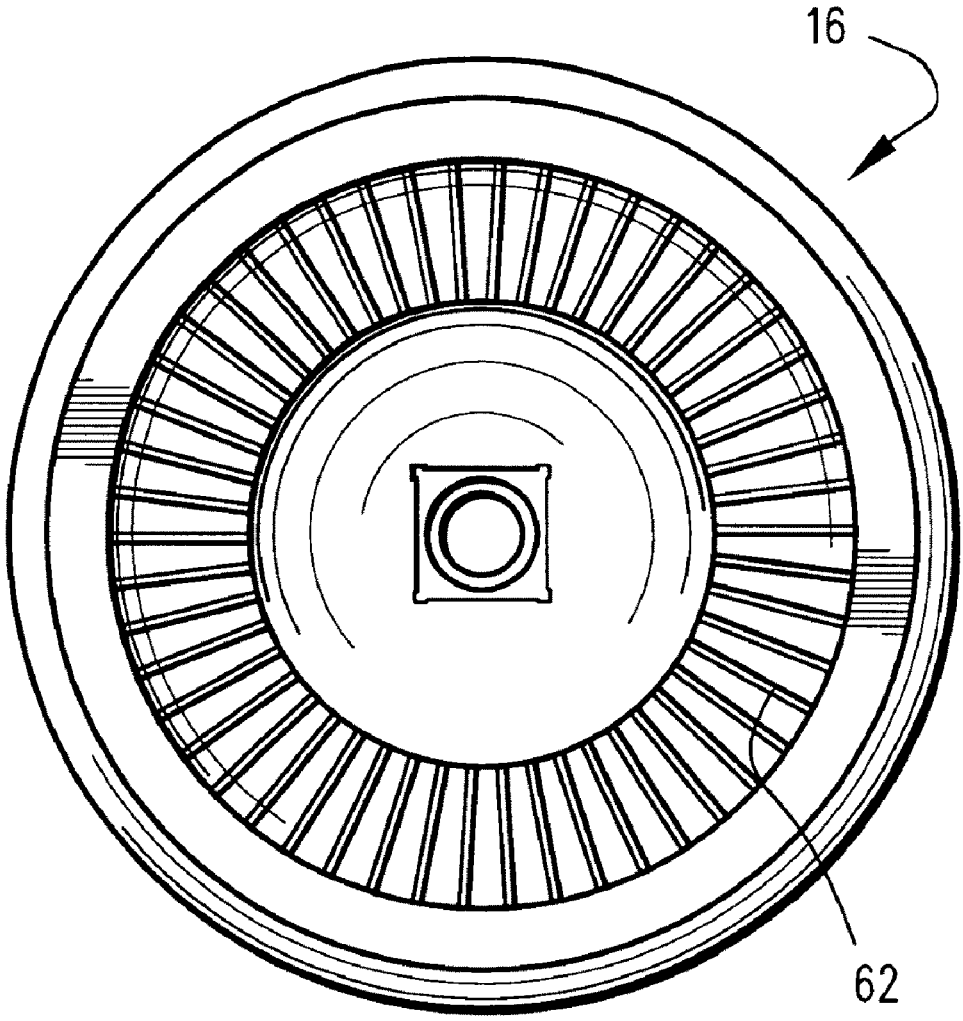
FIG. 12 is a bottom plan view of the rotor plate cap component incorporated in the sprinkler shown in FIGS. 1, 2 and 6.

With reference now also to FIGS. 8 and 9, the nozzle component 48 has a depending tab 56 which seats within one of the discrete flow passages in the core flow path component 40. At the same time, the upper end of the nozzle component 48 is provided with a raised arcuate rib 58 extending approximately 180° about the circumference of the nozzle component, that is adapted to seat within the similarly shaped groove 60 on the underside of the sprinkler body cap 16 (see FIG. 10). Since the cap 16 is threadably secured on the riser 12, it will be appreciated that by "keying" the nozzle to both the core flow path component 40 and the sprinkler body cap 16 (via tab 56 and rib 58, respectively), the core flow path component 40 and the nozzle 48 are prevented from any rotation within the sleeve 18. On the other hand, the baffle 38 is rotatable with the shaft 26 relative to the ports 46a, b, c and d in an adjustment mode as described further below.

Returning to FIG. 1, it may be seen that the underside of the rotor plate cap 30 is provided with an annular array of teeth 62 and the upper surface of the stator 34 is provided with an annular array of mating teeth 64. Since the shaft 26 is sized to allow an axial space 66 between the upper end of the shaft and the plug 35 which prevents escape of any viscous fluid from the upper end of the rotor plate, the rotor plate 22 as well as the rotor body cap 30 and bearing 28 can be pressed downwardly along the shaft 26 relative to the fixed stator 34. This movement is apparent from FIG. 2 which shows the mating teeth 60 and 62 in engagement by reason of a downward pressing action on the rotor plate 22. With the rotor plate and stator so engaged, it will be appreciated that by rotating the rotor plate, the shaft 26 as well as the baffle 38 at the lower end of the shaft will rotate relative to the fixed core component 40.

Figure 3:
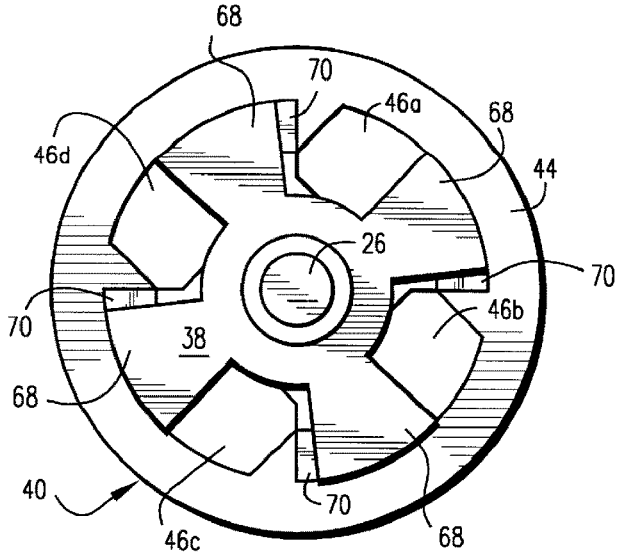
FIG. 3 is a bottom plan view of a baffle and core flow through component, with the ports in the core wide open.
Figure 4:
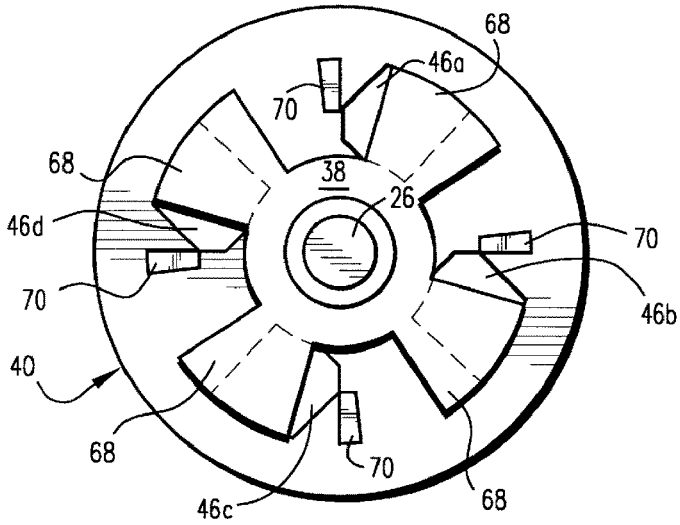
FIG. 4 is a view similar to FIG. 3 but illustrating the baffle rotated to a position that partially closes the ports in the core.
Figure 5:
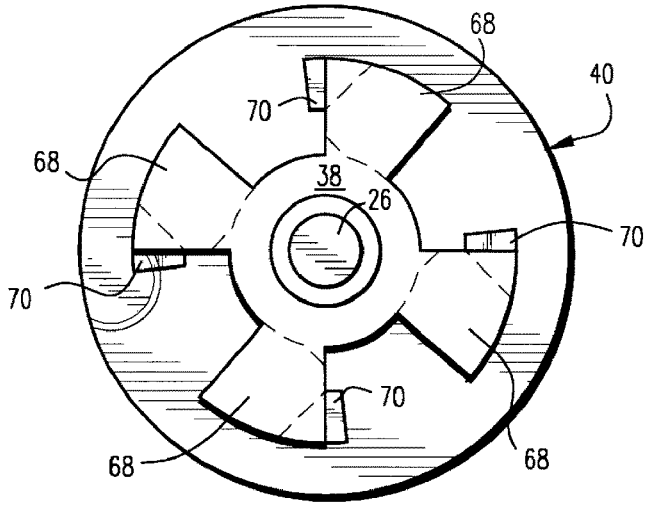
FIG. 5 is a view similar to FIG. 4 but with the baffle rotated to a position that fully closes the ports in the core.

Turning now to FIGS. 3-5, it can be seen that radially extending lobes 68 on the baffle 38 are rotatable between a fully open position as shown in FIG. 3, where the ports 46a through d in the core flow path component 40 are wide open, and where the lobes 68 have been rotated against one side of stop elements 70 to positions as shown in either FIG. 4 or 5 (or anywhere in between). Thus, in FIG. 4, the baffle 38 has been shown rotated slightly in a counterclockwise direction to partially close the ports 46a through d. This will reduce the flow rate of water through the apertures and into the nozzle component, thus reducing both the flow rate and the radius of throw of the emitted stream. FIG. 5 illustrates a condition where the baffle 38 has been rotated to the maximum extent possible in a counterclockwise direction, so that the lobes 68 engage the opposite sides of stop elements 70, and, in this position, the ports 46a through d in the core flow path component 40 are fully closed, thus preventing any flow from reaching the nozzle component. It is not necessarily anticipated that the ports would be fully closed in any normal application, but the drawings nevertheless indicate the full range of movement of the baffle 38.

Returning to FIG. 2, after the flow adjustment-described above, the rotor plate 22 is pulled upwardly and returned to the position shown in FIG. 1 such that the mating arrays of teeth 62 and 64 will become disengaged so that rotation of the rotor plate 22 will not cause commensurate rotation of the shaft 26. Thus, when water flows through the nozzle 48 and impinges on the grooves 24, the rotor plate 22 will rotate about the shaft 26 to distribute the water stream radially outwardly in the desired sprinkling pattern, with a reduced (or increased) radius of throw and reduced (or increased) flow rate, depending on the adjustment.

Figure 6:
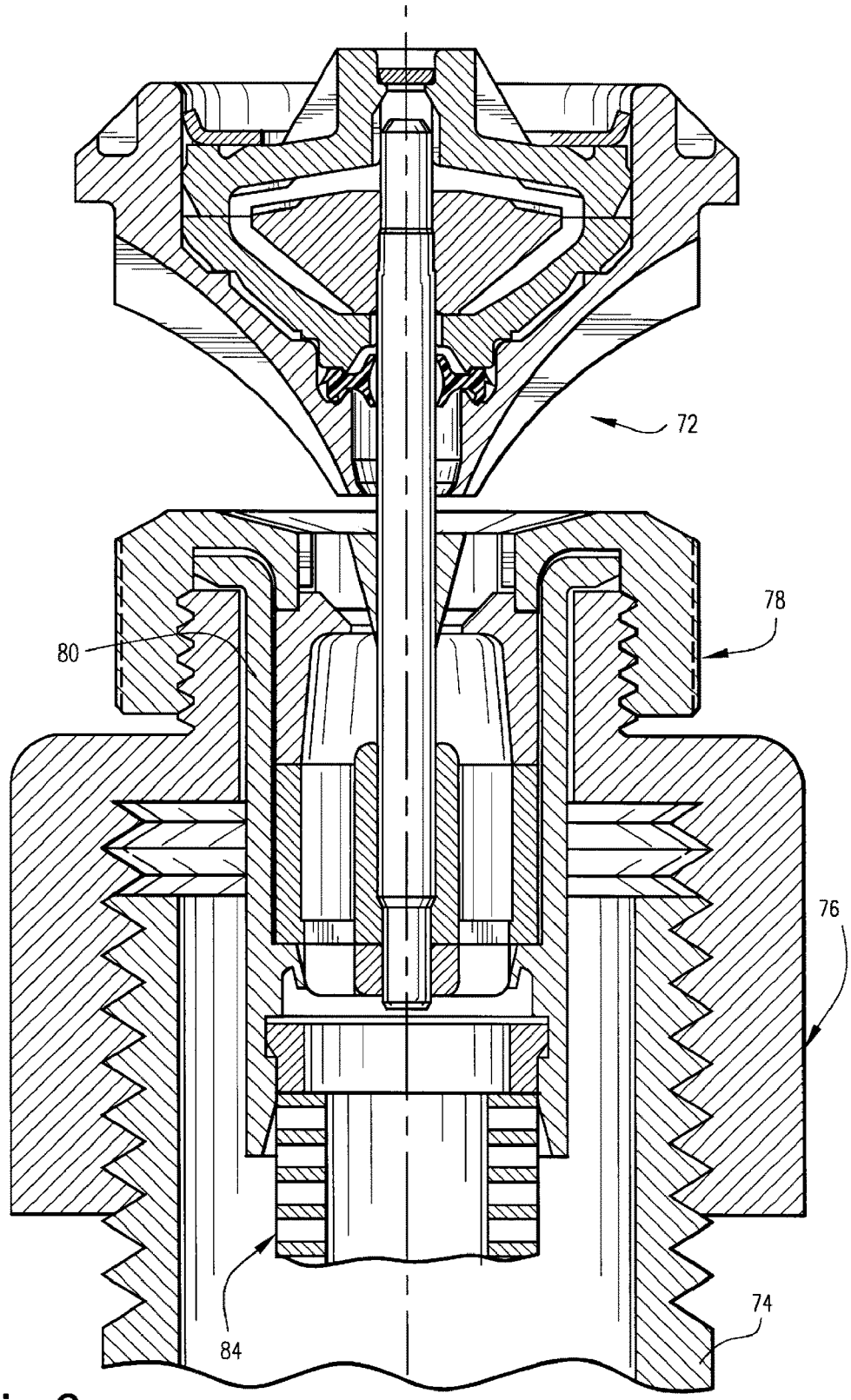
FIG. 6 is a partial side section of a micro-stream rotator in accordance with a variation of the embodiment shown in FIGS. 1-5.

In FIG. 6, an alternative sprinkler arrangement is shown where the sprinkler mechanism as described above (indicated generally by numeral 72) is mounted on a fixed riser 74, rather than in a pop-up type sprinkler body. In this embodiment, an adapter 76 is threadably engaged between the fixed riser 74 and a cap 78 similar to sprinkler body cap 16. Note also that flanged sleeve 80 (similar lo sleeve 18) is supported on the upper edge of the adapter 76 and sandwiched between the upper edge of the adapter and the cap 78.

In both of the illustrated embodiments, a filter element 82 (or 84) is supported by the respective sleeves 18 and 80, but is not considered part of the invention per se.

Figure 13:
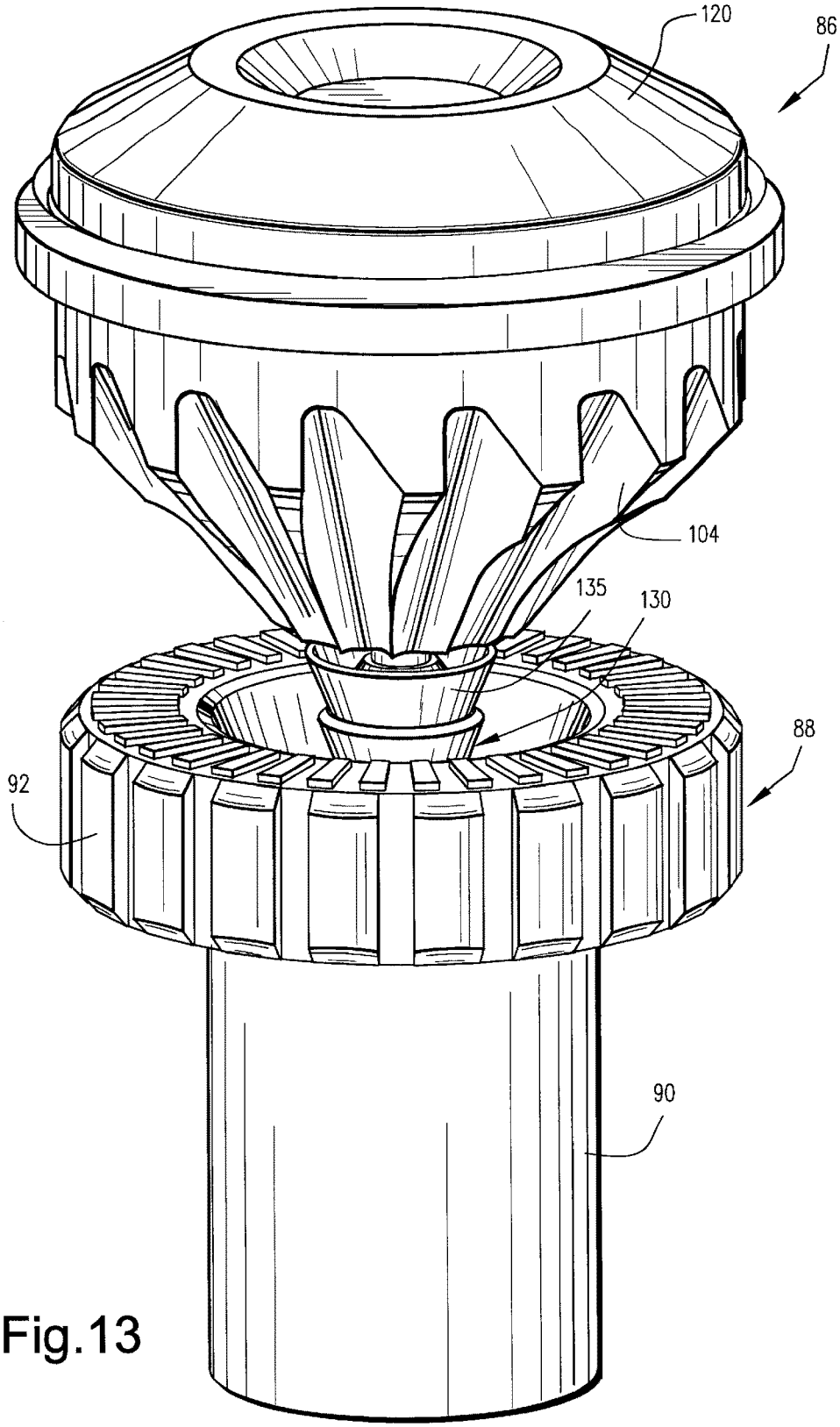
FIG. 13 is a perspective view of a micro-stream rotating type sprinkler in accordance with a second and preferred embodiment of the invention.

Turning now to FIG. 13, a sprinkler 86 in accordance with a preferred embodiment of the invention is illustrated. In this embodiment, a base piece or component 88 combines the earlier described sprinkler body cap 16 and inner sleeve 18 into a single, integral part. The base 88 thus includes an inner sleeve portion 90 and a cap portion 92 having an interiorly threaded flange 94 by which the sprinkler may be attached to a riser or sleeve (as shown, for example, at 12 in FIG. 1) or the like. The base 88 is also formed with a downwardly and radially inwardly tapering surface 96 terminating at an annular edge 98 defining the outer radius (or diameter) of the nozzle orifice.

A shaft 100 extends from the base 88 through the nozzle orifice and into a rotor plate 102 that, like the rotor plate 22, is formed with a plurality of off-center, circumferentially arranged grooves 104 that are configured to cause the rotor plate to rotate relative to the shaft 100 when a stream emitted from the nozzle impinges on the grooves 104.

The rotor plate 102 is formed with an internal fluid chamber 108 that is adapted to be filled (or at least partially filled) with a viscous fluid 110. The shaft 100 extends through the chamber, with the remote end 112 of the shaft seated in a recess 114 formed in the cap 116. The latter is press fit within the rotor plate, seated on an annular ledge 118 and partially closing the chamber 108. The upper end of the chamber is then sealed by a cover 120. An O-ring 121 sits on an annular shoulder 123 and also engages the cover 120 to thereby seal the chamber 108, preventing leakage around the upper end 112 of the shaft 100. Note that the shaft is loosely seated in recess 114, allowing the rotor plate to rotate about the shaft.

A stator 122 is fixed to the shaft 100 and located within the chamber 108. Stator 122 engages a bearing 124, loosely fit on the shaft. An annular seal 126 is captured between the bearing 124 and a lower edge 128 of the rotor plate to thereby seal the lower end of the rotor plate against leakage from the chamber 108. Thus, in a manner similar to the earlier described embodiment, rotation of the rotor plate will be slowed by the viscous shearing of fluid between the stator 122 and the rotor plate wall forming the chamber 108.

Figure 14:
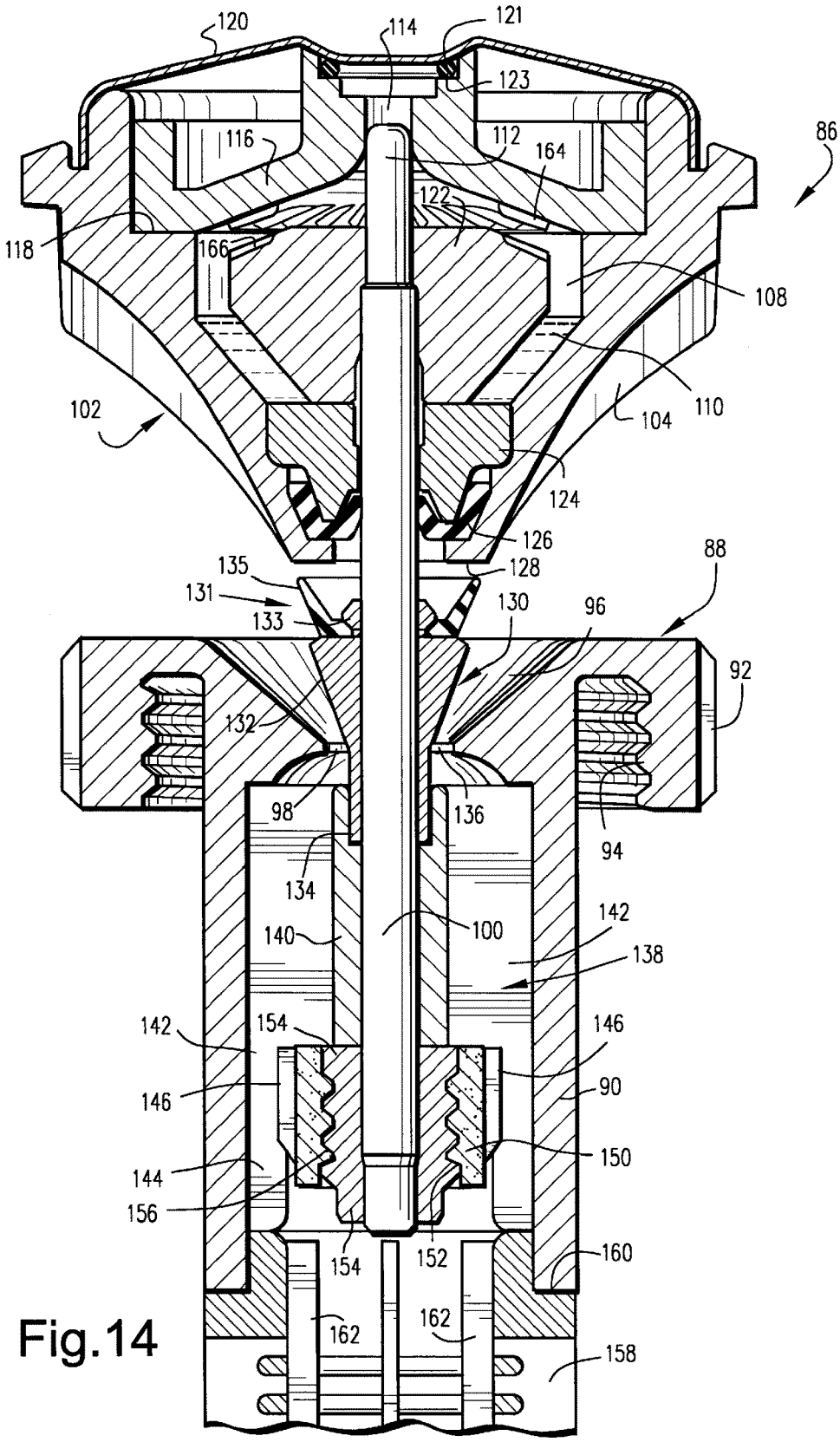
FIG. 14 is a cross section of the sprinkler shown in FIG. 13.
Figure 15:
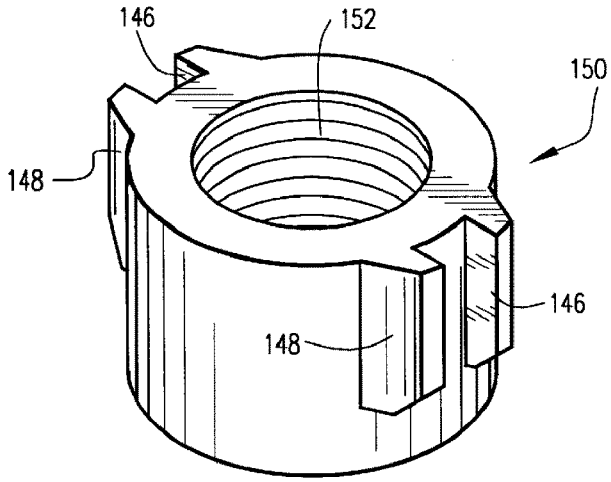
FIG. 15 is a perspective view of a throttle member incorporated in the sprinkler shown in FIG. 14.

A deflector 130, is press fit onto the shaft 100 so as to be located adjacent the nozzle outer edge 98. The deflector 130 is formed with an inwardly and downwardly tapering (as viewed in FIG. 14) surface 132 and a lower cylindrical portion 134. Thus, the nozzle orifice 136 is defined by the outer edge 98 and the lowermost part of the tapered surface 132 of the deflector 130. Note that the tapered surface 132 of the nozzle will produce a stream that exits the nozzle orifice at about a 20° angle to the shaft axis. In the event the nozzle orifice extends a full 360°, then the edge 98 defines the nozzle orifice OD and surface 132 of the deflector 130 defines the nozzle orifice ID. It should be noted that by keeping the nozzle orifice close to the shaft axis, for any given flow rate, the nozzle opening is maximized to thereby reduce the possibility of plugging.

An elastomeric shield 131 is seated in a groove 133 formed at the upper end of the deflector 130, with an angled flange 135 extending upwardly and radially outwardly toward the apex of the rotor plate. This shield serves to insure that water will not impinge upon the seal 126, and it prevents said particles from becoming jammed between the rotor plate 86 and the sprinkler body cap portion 92. This arrangement, along with the deflector 130 itself, facilitates keeping the nozzle orifice close to the shaft axis while at the same time insuring that the stream is directed to the grooves in the rotor plate.

Figure 16:
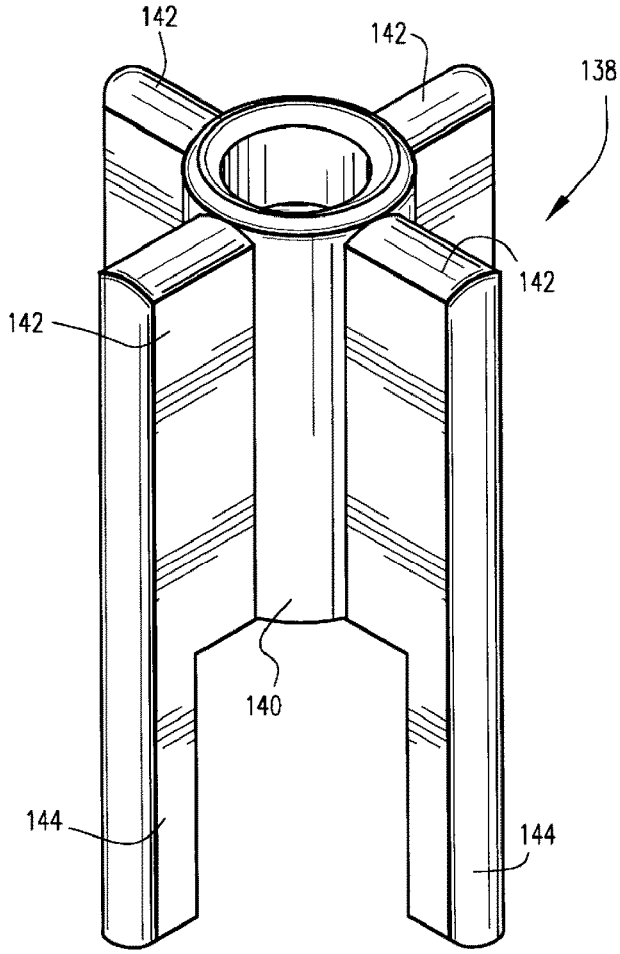
FIG. 16 is a perspective view of a spider component incorporated in the sprinkler shown in FIG. 14.
Figure 17:
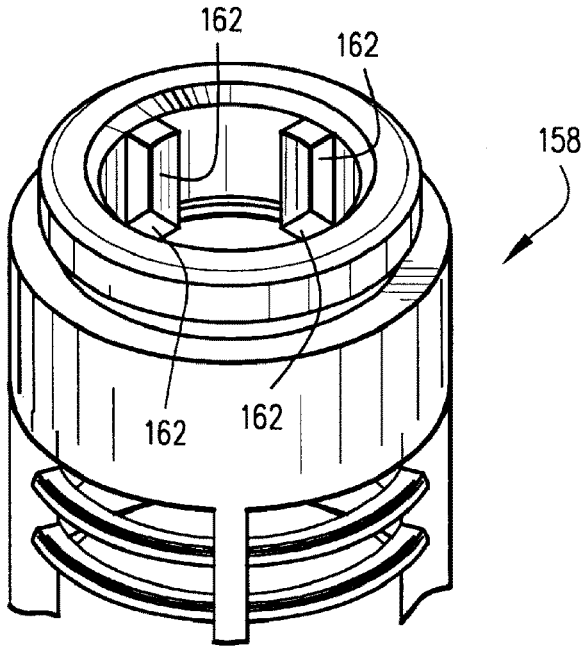
FIG. 17 is a perspective view of a part of a filter incorporating a flow restrictor seat incorporated in the sprinkler shown in FIG. 14.
Figure 18:
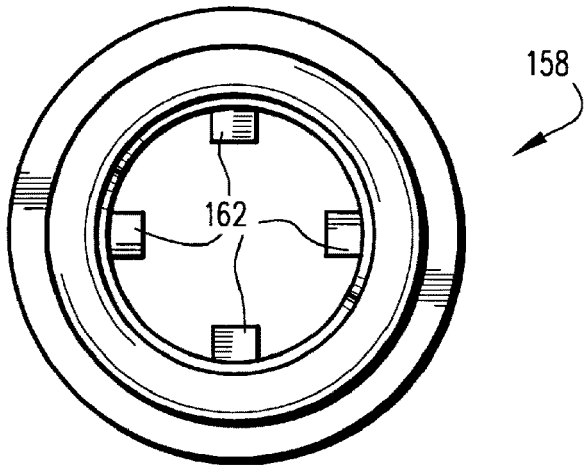
FIG. 18 is a top plan view of the filter illustrated in FIG. 17.

Within the sprinkler base component 88, a spider component 138 is located on the shaft, below the deflector 130. The spider 138, best seen in FIG. 16, includes a tubular sleeve portion 140 which slides over the shaft 100, and a plurality (preferably four at 90° intervals) of radially outwardly extending ribs 142 having lower portions 144 that extend beyond (below) the sleeve portion 140. Rib portions 144 of two opposed ribs 142 are receivable within or between respective pairs of axial ribs 146, 148 provided on the external surface of a throttle member 150. The throttle member 150 is cylindrical in shape, with a threaded interior bore 152. A collar 154 is threaded on its exterior surface 156 so that the throttle member can be threaded onto the collar. After the deflector 130 and spider 138 are in place on the shaft 100, the sub-assembly of the throttle member 150 and collar 154 is press fit onto the shaft. This sub-assembly is oriented so that the lower rib portions 144 are located between the rib pairs 146, 148, ensuring that the throttle member 150 will not rotate when the shaft 100 is rotated in the adjustment mode. By constraining the throttle member against rotation, it is forced to move axially on the shaft, toward or away from a fixed seat (described below) depending on the direction of rotation of the shaft. A filter 158 may be ultrasonically welded (or otherwise fixed) to the sprinkler base 88 at 160. This otherwise conventional filter is modified to the extent of having four axially extending ribs 162 arranged at 90° intervals about the inside diameter of the filter. These ribs 162 provide a fixed seat for the throttle member 150 when the latter is in its most restrictive flow position, i.e., fully seated on the ribs 162. Since the ribs 162 present a discontinuous seat to the throttle member 150, a complete shut-off of the flow is not possible.

Figure 19:
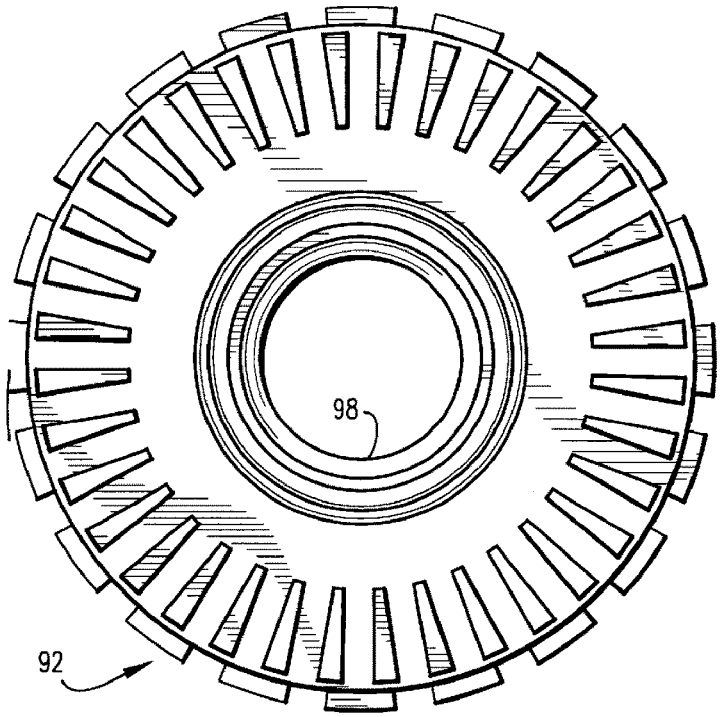
FIG. 19 is a plan view of the sprinkler base incorporated in the sprinkler shown in FIGS. 13 and 14.
Figure 20:
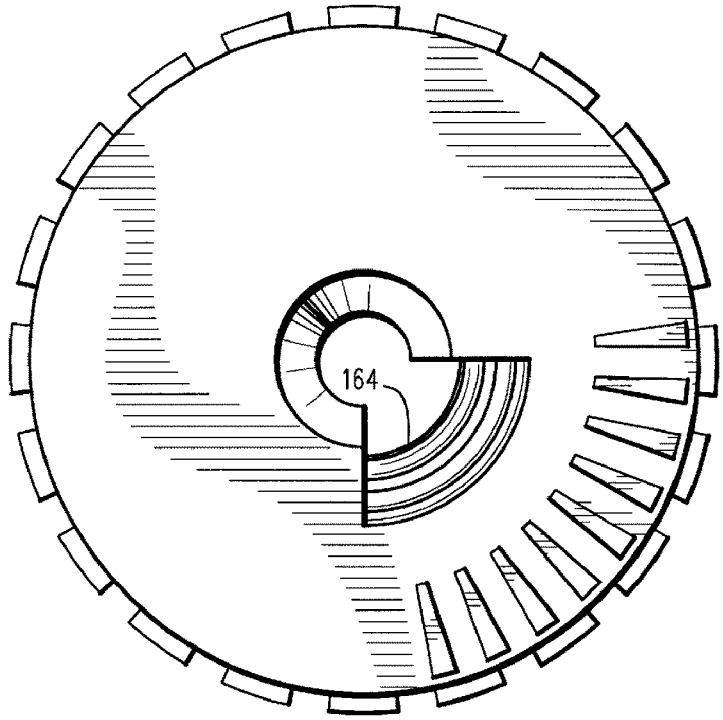
FIG. 20 is a plan view of a variation of the sprinkler body cap shown in FIG. 19.
Figure 1:
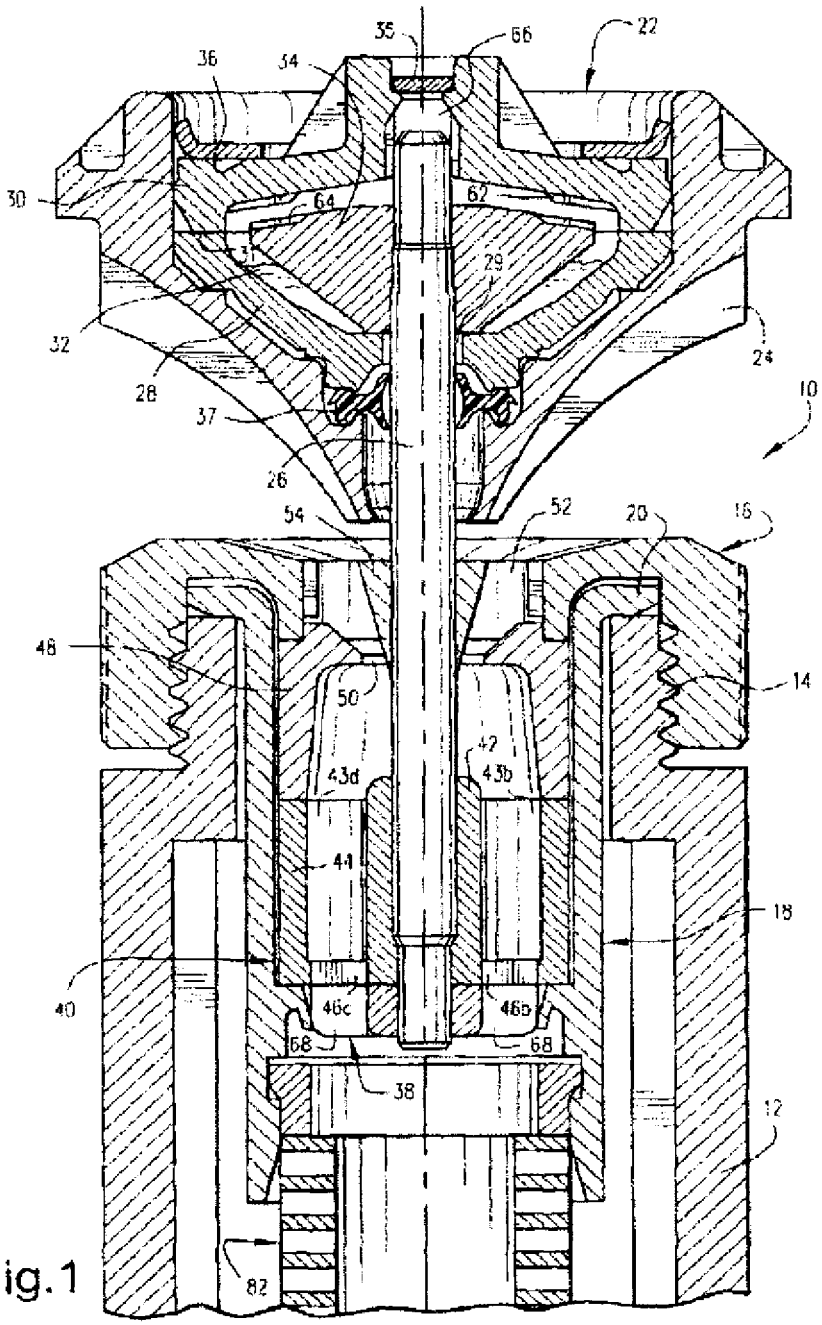
Figure 2:
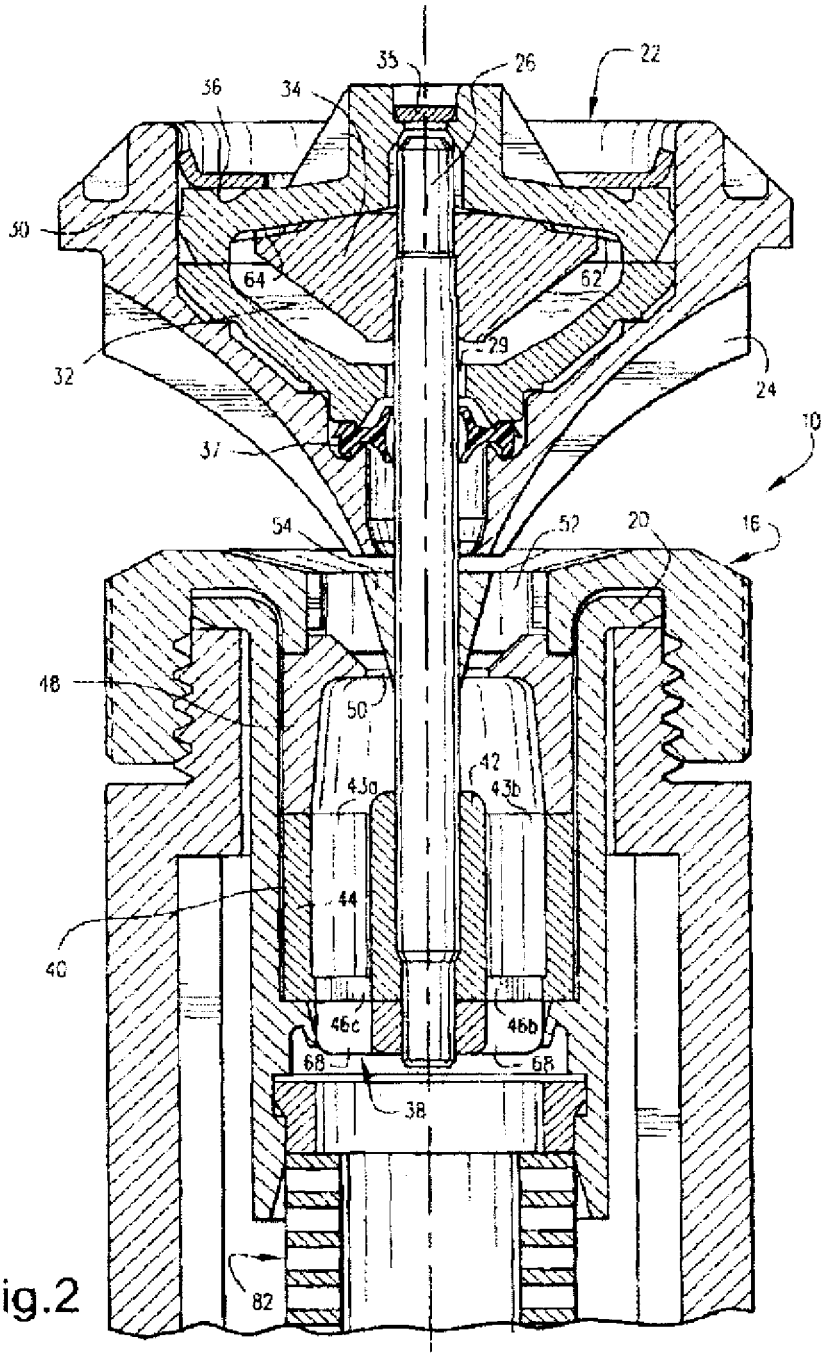

FIG. 19 shows the nozzle orifice, as defined by radially outer edge 98 (the deflector 130 and shaft 100 are omitted), extending a full 360°. FIG. 20 shows one alternative nozzle configuration where the nozzle orifice, as defined by radially outer radius 164, extends only about 90° about the shaft. Other nozzle orifice configurations producing arcs of e.g., 180° or 270° are also within the scope of the invention.

Thus, for adjustment of the flow rate, the user presses downwardly on the rotor plate, causing the teeth 164 on the inside of the rotor body cap to engage with the teeth 166 on the upper surface of the stator establishing a drive mechanism by which the shaft will rotate with the rotor plate, causing the throttle member 150 to move upwardly or downwardly on the shaft 100 depending on the direction of rotation of the rotor plate. In this manner, the flow rate of water to the nozzle may be adjusted as desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

[1. A rotating stream sprinkler comprising:

a rotor plate supported on one end of a shaft for rotation, in an operative mode, relative to the shaft; a nozzle located along said shaft upstream of said rotor plate, said shaft and said nozzle supported within a base component of the sprinkler; said rotor plate formed with a chamber, with one end of said shaft having a stator fixed thereto within said chamber, said chamber at least partially filled with a viscous fluid; and wherein said chamber is at least partially closed at an upper end thereof by a rotor plate cap; and further wherein an underside of said rotor plate cap is provided with a first plurality of teeth and an upper surface of said stator is provided with a second plurality of teeth adapted to engage said first plurality of teeth to enable rotation of said rotor plate with said shaft in an adjustment mode.]

[2. The rotating stream sprinkler of claim 1 wherein said rotor plate is movable axially on said shaft to enable engagement of said first and second plurality of teeth.]

[3. The rotating stream sprinkler of claim 1 wherein said rotor plate is formed with a plurality of grooves in an exterior surface thereof adapted to receive a stream from said nozzle, said grooves configured to cause said rotor plate to rotate when said stream impinges on said grooves.]

[4. The rotating stream sprinkler of claim 1 wherein said shaft has an opposite threaded end and a throttle member threadably mounted on said opposite end, such that when said shaft is rotated with said first and second plurality of teeth engaged in said adjustment mode, said throttle member moves axially on said shaft.]

[5. The rotating stream sprinkler of claim 4 and further comprising a plurality of vertically arranged, circumferentially spaced ribs axially adjacent said throttle member and serving as a seat for said throttle member when said throttle member is moved to a most restrictive flow position.]

[6. The rotating stream sprinkler of claim 5 wherein said throttle has a plurality of axial ribs on an exterior surface thereof and adapted to intermesh with a plurality of axially extending ribs on a spider member fixed within said sprinkler body, thereby preventing said throttle member from rotating.]

[7. The rotating stream sprinkler of claim 6 wherein said spider member is mounted on said shaft axially between said nozzle and said throttle member.]

[8. The rotating stream sprinkler of claim 7 wherein a threaded collar is press fit on said shaft and said throttle member is threadably mounted on said collar.]

[9. The rotating stream sprinkler of claim 1 wherein said nozzle comprises radially inner and outer components, configured to emit a stream at an angle to a central axis of said sprinkler.]

[10. The sprinkler of claim 1 wherein said distributor plate includes a chamber at least partially filled with a viscous fluid and wherein a stator is fixed to said shaft within said chamber.]

[11. A rotating stream sprinkler assembly comprising a sprinkler having an inlet, an outlet including a stationary nozzle; a rotatable stream distributor plate mounted on a shaft downstream of said nozzle and having stream distribution grooves adapted to receive a stream from said nozzle and to distribute said stream, said shaft and said nozzle supported within a base component of the sprinkler; and means for adjusting the flow rate of water flowing to said nozzle.]

[12. The rotating stream sprinkler of claim 11 wherein said nozzle is interchangeable with similar nozzles, each having a different sprinkling pattern.]

[13. The rotating stream sprinkler of claim 12 wherein said means is accessible exteriorly of said sprinkler body.]

[14. The rotating stream sprinkler of claim 11 wherein said distributor plate includes a chamber at least partially filled with a viscous fluid and wherein a stator is fixed to said shaft within said chamber.]

[15. The rotating stream sprinkler of claim 11 wherein said nozzle is configured to emit the stream to atmosphere at an angle relative to a center axis of said sprinkler body.]

[16. The rotating stream sprinkler of claim 15 wherein said shaft lies in said center axis, and wherein said nozzle includes a substantially conical deflector fixed on said shaft.]

[17. The rotating stream sprinkler of claim 16 wherein said deflector mounts an annular shield extending toward said stream distribution plate.]

[18. The rotating stream sprinkler of claim 16 wherein said nozzle and said conical deflector cooperate to emit the stream at an angle of about 20° relative to said center axis.]

[19. The rotating stream sprinkler of claim 11 wherein said stream distributor plate is in the shape of a truncated and inverted cone with grooves formed therein, a radially inner edge thereof forming an apex, said apex lying radially outwardly of an orifice of said nozzle.]

[20. The rotating stream sprinkler of claim 11 wherein said stream distribution plate has a plurality of circumferentially offset grooves so as to cause said plate to rotate when a stream from said nozzle impinges on said grooves.]

[21. A rotating stream sprinkler assembly comprising a sprinkler body having an inlet and an outlet including a stationary nozzle; a rotatable stream distributor plate mounted on a shaft for rotation relative to the shaft, the distributor plate located downstream of said nozzle and having stream distribution grooves adapted to receive a stream from said nozzle and to distribute said stream; a flow rate adjustment mechanism comprising a throttle member threadably mounted on said shaft for movement relative to said shaft, toward or away from an annular seat having a discontinuous edge such that the flow rate cannot be shut off by having said throttle member engage said seat.]

[22. The rotating stream sprinkler of claim 21 wherein said distributor plate rotates relative to said shaft during normal operation but rotates with said shaft during flow rate adjustment.]

[23. The rotating stream sprinkler of claim 22 including means for preventing said throttle member from rotating with said shaft during said flow rate adjustment.]

[24. The rotating stream sprinkler of claim 21 wherein said distributor plate includes a chamber at least partially filled with a viscous fluid and wherein a stator is fixed to said shaft within said chamber.]

[25. The rotating stream sprinkler of claim 21 wherein said discontinuous edge is defined by a plurality of circumferentially spaced, axially extending ribs.]

[26. A rotating stream sprinkler comprising means for delivering liquid to a nozzle; means downstream of said nozzle for distributing liquid emitted from said nozzle in a desired sprinkling pattern; means for adjusting flow rate of water to said nozzle; and means for controlling a speed of rotation of said means for distributing said liquid.]

[27. A rotating stream sprinkler comprising a sprinkler body having an inlet and an outlet including a stationary nozzle; a rotatable stream distributor plate mounted on a shaft for rotation relative to the shaft, the distributor plate located downstream of said nozzle and having stream distribution grooves adapted to receive a stream from said nozzle and to distribute said stream; said distributor plate having a chamber formed therein at least partially filled with a viscous fluid, and a stator fixed to said shaft within said chamber, wherein rotational speed of said rotatable stream distributor plate is viscously dampened; and a flow rate adjustment mechanism comprising a throttle member threadably mounted for movement relative to said shaft, toward or away from an annular seat upstream of said throttle member.]

[28. The rotating stream sprinkler of claim 27 wherein said annular seat has a discontinuous edge such that the flow rate cannot be shut off by having said throttle member engage said seat.]

[29. A rotating stream sprinkler assembly including a sleeve having an inlet and an outlet including a stationary nozzle; a rotatable stream distributor plate mounted on one end of a shaft for rotation relative to the shaft, said shaft supported in said sleeve, the distributor plate located downstream of said nozzle and having stream distribution grooves adapted to receive a stream from said nozzle and to distribute said stream; a flow rate adjustment mechanism comprising a throttle member threadably mounted on said shaft for movement within said sleeve, relative to said shaft, toward or away from an annular seat having a discontinuous edge such that the flow rate cannot be shut off by having said throttle member engage said seat.]

*30. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate; and*

*a pair of throttle components positioned upstream of said nozzle, said pair of throttle components including a first throttle component fixed to said shaft and having at least one flow restriction aperture, and a second throttle component located axially adjacent to said first throttle component and having at least one flow port, wherein said shaft and said first throttle component are rotatable in an adjustment mode to rotate said first throttle component*

*relative to said second throttle component such that said at least one flow restriction aperture rotates relative to said at least one flow port to increase or decrease flow through said nozzle thereby increasing or decreasing the radius of throw of water away from the sprinkler without changing the arc of coverage.*

*31. The rotating stream sprinkler assembly of claim 30, wherein said second throttle component is cylindrical.*

*32. The rotating stream sprinkler assembly of claim 30, wherein said first throttle component is press fit onto said shaft.*

*33. The rotating stream sprinkler assembly of claim 30, wherein said second throttle component at least partially radially encompasses said first throttle component.*

*34. The rotating stream sprinkler assembly of claim 30, wherein said nozzle is stationary.*

*35. The rotating stream sprinkler of claim 30 wherein said nozzle is interchangeable with similar nozzles, each adapted to produce a different sprinkling pattern.*

*36. The rotating stream sprinkler assembly of claim 30, wherein said first and second throttle components are adjustable to increase or decrease a flow opening through said sprinkler to increase or decrease flow through said nozzle.*

*37. The rotating stream sprinkler assembly of claim 36, wherein said flow opening is defined between said second throttle component and a bore of said sprinkler.*

*38. The rotating stream sprinkler assembly of claim 30, wherein said first and second throttle components are configured such that in a maximum restricted flow position, flow to said nozzle is not shut off.*

*39. The rotating stream sprinkler assembly of claim 30, wherein said shaft is normally non-rotatable in an operational mode.*

*40. The rotating stream sprinkler assembly of claim 30, wherein said second throttle component is disposed axially between said nozzle and said first throttle component.*

*41. A method of adjusting flow rate to a nozzle in a rotating stream sprinkler, the method comprising:*

*rotating a shaft of said sprinkler whereby a first throttle component coupled to said shaft engages a second throttle component to move said second throttle component in a direction parallel to an axis of said shaft,*

*wherein said second throttle component is positioned upstream of said nozzle and axial movement of said second throttle component increases or decreases flow through said nozzle to increase or decrease the radius of throw of water away from the sprinkler without changing the arc of coverage; and wherein the shaft extends through a center of the nozzle.*

*42. The method of claim 41, further comprising:*

*engaging a drive element of a distributor plate with a cooperative drive element coupled to said shaft whereby rotational movement applied to said distributor plate is transferred to said shaft; and*

*rotating said distributor plate.*

*43. The method of claim 41, wherein said rotating step includes moving said second throttle component between a first restrictive position and a second restrictive position.*

*44. The method of claim 41, wherein said rotating step includes constraining rotational movement of said second throttle component.*

*45. The method of claim 41, wherein said rotating step includes engaging threads of said first throttle component with threads of said second throttle component.*

*46. The method of claim 41, wherein said rotating step includes moving said second throttle component in an axial direction relative to a seated position in an adjustment mode to increase or decrease clearance between a bore formed said sprinkler and said second throttle component.*

*47. The method of claim 46, wherein said second throttle component is positioned against a discontinuous seat of said sprinkler when said second throttle component is positioned at said seated position.*

*48. The method of claim 47, wherein said discontinuous seat is positioned upstream of said second throttle component.*

*49. The method of claim 47, wherein said discontinuous seat is configured to allow flow between said second throttle component and said bore when said second throttle component is in said seated position.*

*50. The method of claim 49, wherein said seated position is a maximum restricted flow position for said second throttle component such that flow through said nozzle is a minimum when said second throttle component is at said seated position.*

*51. The method of claim 49, wherein said discontinuous seat comprises a plurality of ribs against which said second throttle member is positioned when at the seated position.*

*52. The method of claim 51, wherein said ribs extend axially within said bore, said ribs being disposed along an interior surface of said bore and extending inwardly toward a center of said bore.*

*53. The method of claim 47, wherein said discontinuous seat is axially fixed relative to said nozzle.*

*54. The method of claim 46, wherein said rotating step includes moving said second throttle component in an axial direction relative to a filter component in the adjustment mode to increase or decrease clearance between a bore of said filter component and said second throttle component to increase or decrease flow through said bore.*

*55. The method of claim 54, wherein said filter component comprises a discontinuous seat against which said second throttle component is positioned when at said seated position, said discontinuous seat allowing flow between said filter component and said second throttle component when said second throttle component is in the seated position.*

*56. The method of claim 55, wherein said discontinuous seat is formed at least in part by a plurality of ribs, said second throttle component being seated against said ribs when in the seated position.*

*57. The method of claim 56, wherein said ribs extend axially within said bore of said filter component, said ribs being disposed along an interior surface of said bore and extending inwardly toward a center of said bore.*

*58. The method of claim 25, wherein the shaft is disposed along a central axis of a rotatable stream distributor plate, and the first throttle component is coupled to said shaft, and the step of rotating said shaft comprises rotating the shaft and the first throttle component in an adjustment mode to rotate the first throttle component relative to the second throttle component.*

*59. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate, said distributor plate being rotatable relative to said shaft in an operational mode; and*

*a pair of throttle components including a first throttle component fixed to said shaft and having at least one flow restriction aperture, and a second throttle component*

*located axially adjacent to said first throttle component and having at least one flow port, wherein said shaft and said first throttle component are rotatable in an adjustment mode to rotate said first throttle component relative to said second throttle component such that said at least one flow restriction aperture rotates relative to said at least one flow port to increase or decrease flow through said nozzle thereby increasing or decreasing the radius of throw of water away from the sprinkler without changing the arc of coverage.*

*60. The rotating stream sprinkler assembly of claim 59, wherein impingement of said stream on said distributor plate causes said distributor plate to rotate in said operational mode to thereby distribute said stream.*

*61. The rotating stream sprinkler assembly of claim 59, wherein said shaft is normally non-rotatable in the operational mode.*

*62. The rotating stream sprinkler assembly of claim 59, wherein said second throttle component is disposed axially between said nozzle and said first throttle component.*

*63. The rotating stream sprinkler assembly of claim 59, wherein said pair of throttle components are positioned upstream of said nozzle.*

*64. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate, said shaft being normally non-rotatable in an operational mode; and*

*a pair of throttle components including a first throttle component fixed to said shaft and having at least one flow restriction aperture, and a second throttle component located axially adjacent to said first throttle component and having at least one flow port, wherein said shaft and said first throttle component are rotatable in an adjustment mode to rotate said first throttle component relative to said second throttle component such that said at least one flow restriction aperture rotates relative to said at least one flow port to increase or decrease flow through said nozzle thereby increasing or decreasing the radius of throw of water away from the sprinkler without changing the arc of coverage.*

*65. The rotating stream sprinkler assembly of claim 64, wherein said second throttle component is disposed axially between said nozzle and said first throttle component.*

*66. The rotating stream sprinkler assembly of claim 64, wherein said pair of throttle components are positioned upstream of said nozzle.*

*67. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate; and*

*a pair of throttle components including a first throttle component fixed to said shaft and having a plurality of flow restriction apertures, and a second throttle component located axially adjacent to said first throttle component and having at least one flow port, wherein said shaft and said first throttle component are rotatable in an adjustment mode to rotate said first throttle component relative to said second throttle component such that said plurality of flow restriction apertures rotate relative to said at least one flow port to increase or decrease flow through said nozzle thereby increasing or decreasing the radius of throw of water away from the sprinkler without changing the arc of coverage.*

*68. The rotating stream sprinkler assembly of claim 67, wherein said plurality of flow restriction apertures are formed between a plurality of radially extending lobes.*

*69. The rotating stream sprinkler assembly of claim 67, wherein said shaft is normally non-rotatable in an operational mode.*

*70. The rotating stream sprinkler assembly of claim 67, wherein said second throttle component is disposed axially between said nozzle and said first throttle component.*

*71. The rotating stream sprinkler assembly of claim 67, wherein said pair of throttle components are positioned upstream of said nozzle.*

*72. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate; and*

*a pair of throttle components including a first throttle component fixed to said shaft and having at least one flow restriction aperture, and a second throttle component located axially adjacent to said first throttle component and having a plurality of flow ports, wherein said shaft and said first throttle component are rotatable in an adjustment mode to rotate said first throttle component relative to said second throttle component such that said at least one flow restriction aperture rotates relative to said plurality of flow ports to increase or decrease flow through said nozzle thereby increasing or decreasing the radius of throw of water away from the sprinkler without changing the arc of coverage.*

*73. The rotating stream sprinkler assembly of claim 72, wherein said shaft is normally non-rotatable in an operational mode.*

*74. The rotating stream sprinkler assembly of claim 72, wherein said second throttle component is disposed axially between said nozzle and said first throttle component.*

*75. The rotating stream sprinkler assembly of claim 72, wherein said pair of throttle components are positioned upstream of said nozzle.*

*76. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate; and*

*a pair of throttle components including a first throttle component fixed to said shaft and having at least one flow restriction aperture, and a second throttle component located axially adjacent to said first throttle component between said nozzle and said first throttle component and having at least one flow port, wherein said shaft and said first throttle component are rotatable in an adjustment mode to rotate said first throttle component relative to said second throttle component such that said at least one flow restriction aperture rotates relative to said at least one flow port to increase or decrease flow through said nozzle thereby increasing or decreasing the radius*

*of throw of water away from the sprinkler without changing the arc of coverage.*

*77. The rotating stream sprinkler assembly of claim 76, wherein said shaft is normally non-rotatable in an operational mode.*

*78. The rotating stream sprinkler assembly of claim 76, wherein said pair of throttle components are positioned upstream of said nozzle.*

*79. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate; and*

*a pair of throttle components including a first throttle component fixed to said shaft and having at least one flow restriction aperture, and a second throttle component located axially adjacent to said first throttle component and having at least one flow port, wherein said shaft and said first throttle component are rotatable in an adjustment mode to rotate said first throttle component relative to said second throttle component such that said at least one flow restriction aperture rotates relative to said at least one flow port to increase or decrease flow through said nozzle thereby increasing or decreasing the radius of throw of water away from the sprinkler without changing the arc of coverage, wherein said throttle components do not move in an axial direction in said adjustment mode.*

*80. The rotating stream sprinkler assembly of claim 79, wherein said shaft is normally non-rotatable in an operational mode.*

*81. The rotating stream sprinkler assembly of claim 79, wherein said second throttle component is disposed axially between said nozzle and said first throttle component.*

*82. The rotating stream sprinkler assembly of claim 79, wherein said pair of throttle components are positioned upstream of said nozzle.*

*83. A rotating stream sprinkler assembly comprising:*

*a sprinkler having an inlet;*

*an outlet including a nozzle;*

*a rotatable stream distributor plate being positioned downstream of said nozzle and having stream distribution grooves adapted to receive a stream from said nozzle;*

*a shaft disposed along a central axis of said rotatable stream distributor plate; and*

*a pair of throttle components including a first throttle component fixed to said shaft and having at least one flow restriction aperture, and a second throttle component located axially adjacent to said first throttle component and having at least one flow port, wherein said shaft and said first throttle component are rotatable in an adjustment mode to rotate said first throttle component relative to said second throttle component such that said at least one flow restriction aperture rotates relative to said at least one flow port to increase or decrease flow through said nozzle thereby increasing or decreasing the radius of throw of water away from the sprinkler without changing the arc of coverage, and wherein only the relative rotation of the first throttle component relative to the second throttle component causes an increase or decrease in the flow through said nozzle.*

*84. The rotating stream sprinkler assembly of claim 83, wherein said shaft is normally non-rotatable in an operational mode.*

*85. The rotating stream sprinkler assembly of claim 83, wherein said second throttle component is disposed axially between said nozzle and said first throttle component.*

*86. The rotating stream sprinkler assembly of claim 83, wherein said pair of throttle components are positioned upstream of said nozzle.*

* * * * *

UNITED STATES PATENT AND TRADEMARK OFFICE

CERTIFICATE OF CORRECTION

PATENT NO. : RE42,596 E
APPLICATION NO. : 11/871456
DATED : August 9, 2011
INVENTOR(S) : George Sesser It is certified that error appears in the above-identified patent and that said Letters Patent is hereby corrected as shown below:

At Column 6, Line 35, please change “lo” to --to--.

At Column 11, Line 17, in Claim 35, please change “sprinkler of” to --sprinkler assembly of--.

At Column 12, Line 48, in Claim 58, please change “claim 25,” to --claim 41,--.

Signed and Sealed this
Thirteenth Day of March, 2012

David J. Kappos

David J. Kappos
*Director of the United States Patent and Trademark Office*

UNITED STATES PATENT AND TRADEMARK OFFICE

CERTIFICATE OF CORRECTION

PATENT NO. : RE42,596 E
APPLICATION NO. : 11/871456
DATED : August 9, 2011
INVENTOR(S) : George Sesser It is certified that error appears in the above-identified patent and that said Letters Patent is hereby corrected as shown below:

Delete the title page and substitute the attached title page therefor.

Drawings

Delete drawing sheets 1 and 2, and substitute the attached drawing sheets 1 and 2 therefor.

Figure 2:
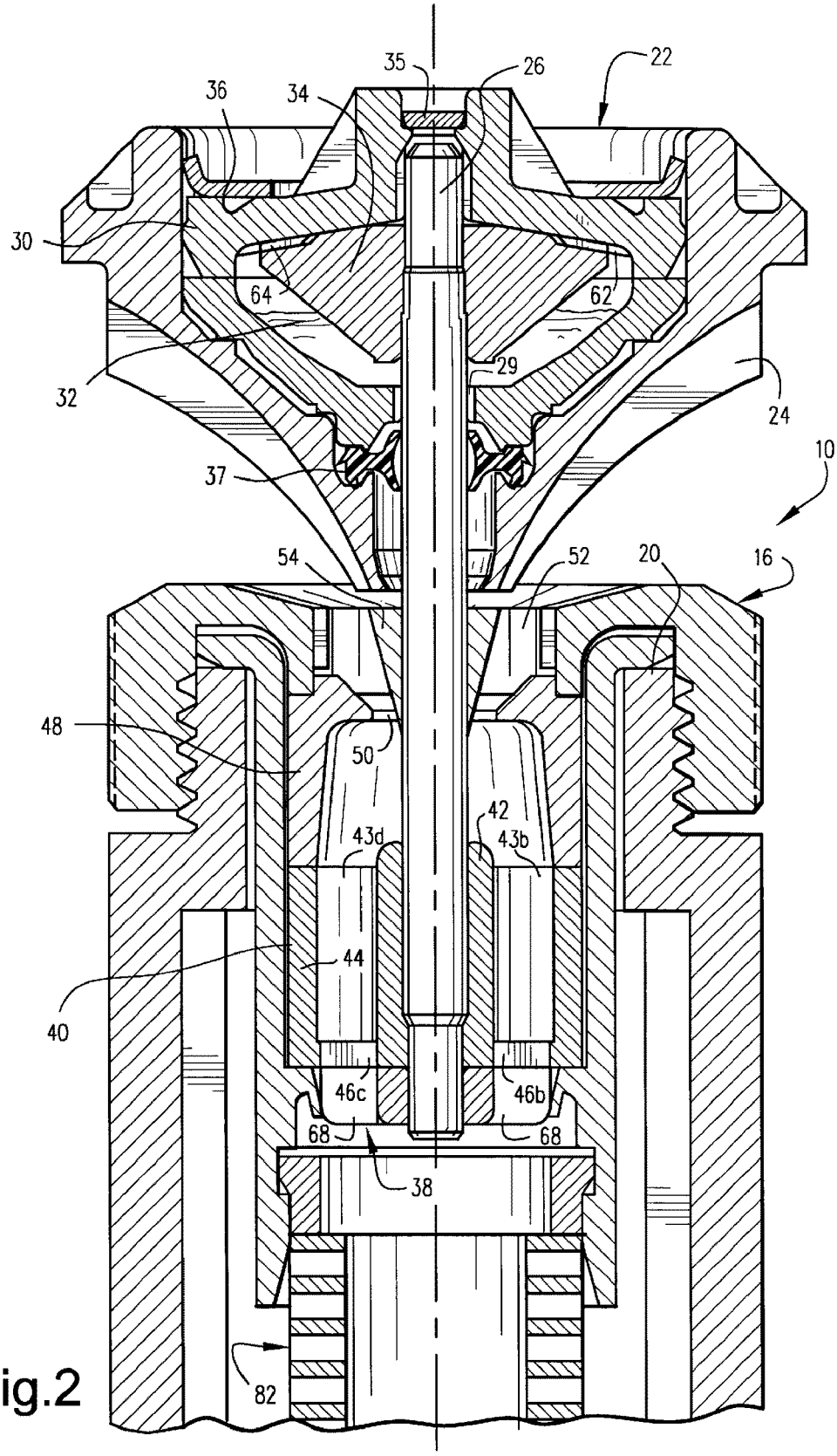
FIG. 2 is a partial side section similar to FIG. 1, but with the rotor plate of the sprinkler pressed downwardly to a position that permits adjustment of the flow rate.

The lead line for reference number 29 in Figure 1 has been changed to be consistent with Figure 2, as shown on the attached pages.

The lead line for reference number 20 in Figure 2 has been changed to be consistent with Figure 1, as shown on the attached pages.

In the Specification

Column 1, lines 15-30 please replace the first paragraph under RELATED APPLICATIONS with the following:

Notice: More than one reissue application has been filed for the reissue of Patent No. 6,499,672. The reissue applications of Patent No. 6,499,672 are U.S. Patent Application 13/205,591, filed August 8, 2011, this Application, U.S. Patent Application No. 11/871,456, filed October 12, 2007, now U.S. Patent No. RE42,596, and U.S. Patent Application No. 11/022,428, filed December 27, 2004, now U.S. Patent No. RE40,440. This application is a continuation reissue application of U.S. Patent Application No. 11/022,428, now U.S. Patent No. RE40,440, which is a reissue application of U.S. Patent Application No. 09/532,772, filed March 22, 2000, now Patent No. 6,499,672, which is a continuation-in-part of U.S. Patent Application No. 09/433,299, filed Nov. 3, 1999, now U.S. Patent No. 6,244,521, the entire contents of each of which are hereby expressly incorporated by reference.

Signed and Sealed this
Seventh Day of January, 2014

Margaret A. Focarino

Margaret A. Focarino
*Commissioner for Patents of the United States Patent and Trademark Office*

(19) United States
(12) Reissued Patent
Sesser

(10) Patent Number: US RE42,596 E
(45) Date of Reissued Patent: Aug. 9, 2011

(54) MICRO-STREAM ROTATOR WITH ADJUSTMENT OF THROW RADIUS AND FLOW RATE

(75) Inventor: George Sesser, Walla Walla, WA (US)

(73) Assignee: Hunter Industries, Inc., San Marcos, CA (US)

( * ) Notice: This patent is subject to a terminal disclaimer.

(21) Appl. No.: 11/871,456

(22) Filed: Oct. 12, 2007

Related U.S. Patent Documents

Reissue of:
(64) Patent No.: Re. 40,440
Issued: Jul. 22, 2008
Appl. No.: 11/022,428
Filed: Dec. 27, 2004

Which is a Reissue of:
(64) Patent No.: 6,499,672
Issued: Dec. 31, 2002
Appl. No.: 09/532,772
Filed: Mar. 22, 2000

U.S. Applications:
(63) Continuation of application No. 11/022,428, filed on Dec. 27, 2004, now Pat. No. Re. 40,440, which is a continuation-in-part of application No. 09/433,299, filed on Nov. 3, 1999, now Pat. No. 6,244,521.

(51) Int. Cl.
*B05B 17/04* (2006.01)

(52) U.S. Cl. ..... 239/11; 239/232; 239/252; 239/262; 239/443; 239/484; 239/514; 239/518; 239/222.11

(58) Field of Classification Search ..... 239/203, 239/222.11, 231, 243, 252, 451, 511, 512, 239/513, 514

See application file for complete search history.

(56) References Cited

U.S. PATENT DOCUMENTS 3,131,867 A 5/1964 Miller et al.

(Continued)

OTHER PUBLICATIONS

Complaint for Declaratory Judgment of Patent Non-Infringement and Invalidity; U.S. District Court—Central District of California, Case No. CV 07-2811 GPS (JTLx); *Rain Bird Corporation* v. *Nelson Irrigation Corporation;* Filed: Apr. 27, 2007.

(Continued)

*Primary Examiner* — Dinh Nguyen
(74) *Attorney, Agent, or Firm* — Knobbe Martens Olson & Bear, LLP

(57) ABSTRACT

A rotating stream sprinkler including a rotor plate supported on one end of a shaft for rotation, in an operative mode, relative to the shaft; a nozzle located along the shaft upstream of the rotor plate; the rotor plate formed with a chamber and one end of the shaft has a stator fixed thereto within the chamber, the fluid chamber at least partially filled with a viscous fluid; and wherein the chamber is at least partially closed at an upper end thereof by a rotor cap plate; and further wherein an underside of the rotor cap plate is provided with a first plurality of teeth and an upper surface of the stator is provided with a second plurality of mating teeth adapted to engage the first plurality of teeth to enable rotation of the rotor plate with the shaft in the adjustment mode. A flow rate adjustment mechanism includes a throttle member threadably mounted on the shaft for movement relative to the shaft, toward or away from an annular seat having a discontinuous edge such that the flow rate cannot be shut off by having the throttle member engage the seat.

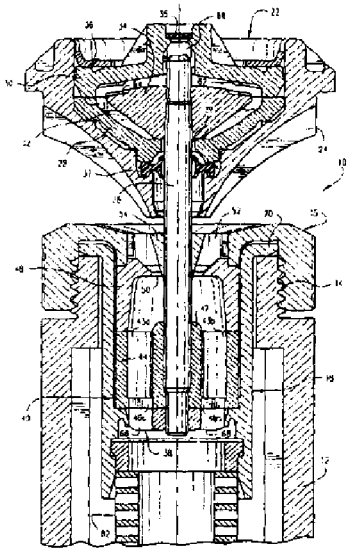

57 Claims, 12 Drawing Sheets